(12) United States Patent
Qiu et al.

(10) Patent No.: US 11,455,831 B2
(45) Date of Patent: Sep. 27, 2022

(54) METHOD AND APPARATUS FOR FACE CLASSIFICATION

(71) Applicant: ArcSoft Corporation Limited, Hangzhou (CN)

(72) Inventors: Han Qiu, Hangzhou (CN); Sanyong Fang, Nanjing (CN); Kangning Song, Hangzhou (CN)

(73) Assignee: ARCSOFT CORPORATION LIMITED, Hangzhou (CN)

( * ) Notice: Subject to any disclaimer, the term of this patent is extended or adjusted under 35 U.S.C. 154(b) by 408 days.

(21) Appl. No.: 16/045,204

(22) Filed: Jul. 25, 2018

(65) Prior Publication Data
US 2019/0034704 A1 Jan. 31, 2019
US 2019/0294863 A9 Sep. 26, 2019

(30) Foreign Application Priority Data

Jul. 25, 2017 (CN) .......................... 201710614131.2

(51) Int. Cl.
*G06V 40/16* (2022.01)
*G06K 9/62* (2022.01)
(Continued)

(52) U.S. Cl.
CPC .......... *G06V 40/172* (2022.01); *G06K 9/627* (2013.01); *G06K 9/6274* (2013.01);
(Continued)

(58) Field of Classification Search
None
See application file for complete search history.

(56) References Cited

U.S. PATENT DOCUMENTS

| 2002/0076088 A1* | 6/2002 | Tsai | G06K 9/6857 382/118 |
| 2013/0151523 A1* | 6/2013 | Hsi | G06F 16/5866 707/737 |

(Continued)

FOREIGN PATENT DOCUMENTS

| CN | 105631439 A | * | 6/2016 | ......... G06K 9/00221 |
| CN | 106529402 A | | 3/2017 | |

(Continued)

OTHER PUBLICATIONS

Lewenberg, Y.—"Predicting Personal Traits from Facial Images Using Convolutional Neural Networks Augmented with Facial Landmark Information"—AAAI-16—Feb. 2016, pp. 4365-4366 (Year: 2016).*

(Continued)

*Primary Examiner* — Bernard Krasnic
(74) *Attorney, Agent, or Firm* — Osha Bergman Watanabe & Burton LLP (57) ABSTRACT

The present disclosure provides a method and apparatus for facial classification, which is applied to the field of image processing. The method includes acquiring a color image of a target face, where the color image includes information of at least one channel, inputting the information into a neural network, and classifying, by the neural network, the target face according to the information and a first parameter. The first parameter includes at least one facial category and first parameter data for identifying a facial category of the target face. The method and device of the present disclosure can analyze facial attributes from the content of a facial image, and automatically classify many facial images according to their facial attributes. This reduces the burden of manual classification, thereby allowing facial images to be stored in (Continued)

a clear and orderly fashion and improving classification efficiency.

28 Claims, 4 Drawing Sheets

(51) Int. Cl.
*G06N 3/08* (2006.01)
*G06N 3/04* (2006.01)
*G06V 10/56* (2022.01)
*G06V 10/44* (2022.01)
*G06V 10/50* (2022.01)

(52) U.S. Cl.
CPC ........... *G06N 3/0454* (2013.01); *G06N 3/084* (2013.01); *G06V 10/454* (2022.01); *G06V 10/507* (2022.01); *G06V 10/56* (2022.01); *G06V 40/165* (2022.01); *G06N 3/0481* (2013.01)

(56) References Cited

U.S. PATENT DOCUMENTS

| | | | |
|---|---|---|---|
| 2017/0213112 A1* | 7/2017 | Sachs | G06T 7/90 |
| 2017/0270653 A1* | 9/2017 | Garnavi | G06N 20/20 |
| 2017/0287109 A1* | 10/2017 | Tasfi | G06T 3/4046 |
| 2019/0325203 A1* | 10/2019 | Yao | G06N 20/00 |
| 2020/0104568 A1* | 4/2020 | Liang | G06K 9/00281 |

FOREIGN PATENT DOCUMENTS

| | | | |
|---|---|---|---|
| CN | 106778682 A | 5/2017 | |
| WO | WO-2019000462 A1 * | 1/2019 | G06K 9/00288 |

OTHER PUBLICATIONS

Stack Overflow: "Why do we always divide RGB values by 255?"—2013-2016, pp. 1-4 (Year: 2016).*

Office Action with Search Report and English translation issued in corresponding Chinese Application No. 201710614131.2, dated Apr. 14, 2020 (21 pages).

* cited by examiner

METHOD AND APPARATUS FOR FACE CLASSIFICATION

CROSS-REFERENCE TO RELATED APPLICATIONS

This application claims priority to Chinese Patent Application No. 201710614131.2, filed on Jul. 25, 2017, which is hereby incorporated by reference in its entirety.

TECHNICAL FIELD

The present invention relates to an image processing method and, specifically, to a method and an apparatus for face classification.

BACKGROUND

With the deepening of the study on the deep learning technology, more and more products developed based on the deep learning technology come into our lives. Technologies in terms of face recognition and face detection have been widely applied in various user terminals. In particular, the study into facial attributes in recent years has highlighted the superiority of the deep learning compared with the conventional method.

For interfaces of home pages of existing smart albums, most of them are intuitive, i.e., an album may be browsed via a navigation bar by selecting a time of using, characters and a map, meanwhile the album is managed in a clear and simple way due to the possibility of displaying of the number of pictures in a folder.

However, currently, there isn't a method available to automatically classify a facial image according to facial attributes, such as age, gender or race, after analyzing the facial attributes through contents of the facial image.

SUMMARY

A method and an apparatus for face classification provided in the present invention can efficiently solve the present problem of incapability of automatically classifying a facial image according to facial attributes after analyzing the facial attributes through contents of the facial image.

In accordance with a first aspect of the present invention, a method for face classification is provided, the method includes:

acquiring a color image of a target face, the color image including information of at least one channel; inputting the information of the at least one channel of the color image of the target face into a neural network; and performing, by the neural network, a classification on the target face in accordance with the information of the at least one channel of the color image of the target face and a first parameter, the first parameter including at least one facial category and data about the first parameter for identifying the category of the target face.

In accordance with the first aspect of the present invention, in a first possible implementation thereof, the method also includes: placing the color image of the target face into at least one corresponding folder in accordance with results from the classification of the target face.

In accordance with the first aspect of the present invention or the first possible implementation thereof, in a second possible implementation of the first aspect of the present invention, the information of the at least one channel of the color image of the target face includes information of three channels of an RGB-formatted color image of the target face, or information of three channels of a YUV-formatted color image of the target face.

In accordance with the first aspect of the present invention or the first possible implementation or the second possible implementation thereof, in a third possible implementation of the first aspect of the present invention, before the inputting the information of the at least one channel of the color image of the target face into a neural network, the method also includes: determining, in accordance with at least one of the following parameters: a pitch angle, a drift angle, a roll angle, a dimension and light conditions, that the color image of the target face qualifies for inputting into the neural network.

In accordance with a third possible implementation of the first aspect of the present invention, in a fourth possible implementation of the first aspect of the present invention, the determining, in accordance with at least one of the following parameters: a pitch angle, a drift angle, a roll angle, a dimension and light conditions, that the color image of the target face qualifies includes: determining that the color image of the target face qualifies in accordance with at least one of the following parameters: the pitch angle smaller than or equal to a first angle; the drift angle smaller than or equal to a second angle; the roll angle smaller than or equal to a third angle; the number of pixels of the color image of the target face greater than or equal to a first threshold; and light intensity greater than or equal to a second threshold.

In accordance with the first aspect of the present invention, or any possible implementation from the first possible implementation of the first aspect of the present invention to the fourth possible implementation of the first aspect of the present invention, in a fifth possible implementation of the first aspect of the present invention, before the inputting the information of the at least one channel of the color image of the target face into a neural network, the method also includes: performing identical first processing on the information of the at least one channel of the color image of the target face, the first processing including at least one of: determining feature points of the information of the at least one channel of the color image of the target face, rotating the information of the at least one channel of the color image of the target face based on the feature points; performing mirroring, linear transformation and affine transformation on the information of the at least one channel of the color image of the target face; aligning the feature points of the information of the at least one channel of the color image of the target face to a set position; performing contrast stretching on the information of the at least one channel of the color image of the target face; and normalizing the information of the at least one channel of the color image of the target face with respect to values of the pixels of the image.

In accordance with the fifth possible implementation of the first aspect of the present invention, in a sixth possible implementation of the first aspect of the present invention, the normalizing the information of the at least one channel of the color image of the target face with respect to values of the pixels of the image includes: normalizing the information of the at least one channel of the color image of the target face with respect to a pixel value from [0,255] to [0,1].

In accordance with the first aspect of the present invention or any possible implementation from the first possible implementation to the sixth possible implementation of the first aspect of the present invention, in a seventh possible implementation of the first aspect of the present invention, the data about the first parameter for identifying the category of the target face is obtained from a color image of multiple face samples that is trained by the neural network; and the color image of the face samples includes: information of at least one channel of the color image of the face samples.

In accordance with the seventh possible implementation of the first aspect of the present invention, in an eighth possible implementation of the first aspect of the present invention, before the color image of the multiple face samples is trained by the neural network, the method also includes: performing identical second processing on the information of at least one channel of the color image of the face samples, the second processing includes at least one of: determining feature points of the information of the at least one channel of the color image of the face samples, rotating the information of the at least one channel of the color image of the face samples based on the feature points; performing mirroring, linear transformation and affine transformation on the information of the at least one channel of the color image of the face samples; aligning the feature points of the information of the at least one channel of the color image of the face samples to a set a position; performing contrast stretching on the information of the at least one channel of the color image of the face samples; and normalizing the information of the at least one channel of the color image of the face samples with respect to values of the image.

In accordance with the eighth possible implementation of the first aspect of the present invention, in a ninth possible implementation of the first aspect of the present invention, the normalizing the information of the at least one channel of the color image of the face samples with respect to pixel values of the image includes: normalizing the information of the at least one channel of the color image of the face samples with respect to a pixel value from [0,255] to [0,1].

In accordance with any possible implementation in the first aspect of the present invention from the seventh possible implementation to the ninth possible implementation, in a tenth possible implementation of the first aspect of the present invention, the face samples carry at least one of the following facial categories: gender, race, age range and age value; the face samples and the information of the at least one channel of the color image of the face samples carry a same one of the facial categories respectively.

In accordance with the tenth possible implementation of the first aspect of the present invention, in an eleventh possible implementation of the first aspect of the present invention, the neural network also includes cost functions carried by the face samples and corresponding to the different facial categories respectively; the neural network also includes a first cost function that includes a weighted sum of the cost functions corresponding to the different facial categories.

In accordance with the first aspect of the present invention and any possible implementation of the first aspect of the present invention from the first possible implementation to the eleventh possible implementation, in a twelfth possible implementation of the first aspect of the present invention, the facial category included in the neural network include at least one of: gender, race, age range and age value.

In accordance with any possible implementation of the first aspect of the present invention from the fifth possible implementation to the twelfth possible implementation, in a thirteenth possible implementation of the first aspect of the present invention, the feature points are eye points.

In accordance with the first aspect of the present invention or any possible implementation thereof from the first possible implementation to the thirteenth possible implementation, in a fourteenth possible implementation of the first aspect of the present invention, the neural network includes a convolution neural network.

In accordance with the fourteenth possible implementation of the first aspect of the present invention, in a fifteenth possible implementation of the first aspect of the present invention, the convolution neural network includes one input layer, three group layers, two fully connected layers and four output layers; and each of the group layers includes a convolution layer, an activation layer and a lower sampling layer.

In accordance with any possible implementation of the first aspect of the present invention from the seventh possible implementation to the fifteenth possible implementation, in a sixteenth possible implementation of the first aspect of the present invention, the information of the at least one channel of the color image of the face samples is information of three channels of an RGB-formated color image of the face samples, or information of three channels of a YUV-formatted color image of the face samples.

In accordance with a second aspect of the present invention, an apparatus for face classification is provided, the apparatus includes: an acquiring module configured to acquire a color image of a target face, the color image including information of at least one channel; and an inputting module configured to input the information of the at least one channel of the color image of the target face into a neural network; wherein the neural network is configured to perform a classification on the target face in accordance with the information of the at least one channel of the color image of the target face and a first parameter, the first parameter including at least one facial category o and data about the first parameter for identifying the category of the target face.

In accordance with the second aspect of the present invention, in the first possible implementation thereof, the apparatus also includes an image classification placing module, where the image classification placing module is configured to place the color image of the target face into at least one corresponding folder in accordance with results from the classification of the target face.

In accordance with the first possible implementation of the second aspect of the present invention, in a second possible implementation of the second aspect of the present invention, the information of the at least one channel of the color image of the target face includes the information of three channels of an RGB-formated color image of the target face, or information of three channels of a YUV formatted color image of the target face.

In accordance with the second aspect of the present invention and the first possible implementation or the second possible implementation of the second aspect of the present invention, in a third possible implementation of the second aspect of the present invention, the apparatus also includes an image qualification determining module, the image qualification determining module is configured to determine, in accordance with at least one of the following parameters: a pitch angle, a drift angle, a roll angle, a dimension and light conditions, that the color image of the target face qualifies before the inputting module inputs the information of the at least one channel of the color image of the target face into the neural network.

In accordance with the second aspect of the present invention and the first possible implementation to the third possible implementation of the second aspect of the present invention, in a fourth possible implementation of the second aspect of the present invention, the image qualification determining module is specifically configured to determine that the color image of the target face qualifies in accordance with at least one of the following parameters: the pitch angle smaller than or equal to a first angle; the drift angle smaller than or equal to a second angle; the roll angle smaller than or equal to a third angle; the number of pixels of the color image of the target face greater than or equal to a first threshold; and light intensity greater than or equal to a second threshold.

In accordance with the second aspect of the present invention and the first possible implementation to the fourth possible implementation of the second aspect of the present invention, in a fifth possible implementation of the second aspect of the present invention, the apparatus also includes a first processing module, the first processing module is configured to perform identical first processing on the information of the at least one channel of the color image of the target face, before the inputting module inputs the information of the at least one channel of the color image of the target face into the neural network, and the first processing module includes at least one of the following sub-modules: a first rotating sub-module, a first transforming sub-module, a first aligning sub-module, a first contrast stretching sub-module and a first normalizing sub-module; the first rotating sub-module is configured to determine feature points of the information of the at least one channel of the color image of the target face, rotate the information of the at least one channel of the color image of the target face based on the feature points; the first transforming sub-module is configured to perform mirroring, linear transformation and affine transformation on the information of the at least one channel of the color image of the target face; the first aligning sub-module is configured to align the feature points of the information of the at least one channel of the color image of the target face to a set position; the first contrast stretching sub-module is configured to perform contrast stretching on the information of the at least one channel of the color image of the target face; and the first normalizing sub-module is configured to normalize the information of the at least one channel of the color image of the target face with respect to pixel values of the image.

In accordance with the fifth possible implementation of the second aspect of the present invention, in a sixth possible implementation of the second aspect of the present invention, the first normalizing sub-module is specifically configured to normalize the information of the at least one channel of the color image of the target face with respect to a pixel value from [0,255] to [0,1].

In accordance with the second aspect of the present invention and the first possible implementation to the sixth possible implementation of the second aspect of the present invention, in a seventh possible implementation of the second aspect of the present invention, the data about the first parameter for identifying the category of the target face is obtained from a color image of multiple face samples that is trained by the neural network; and the color image of the face samples includes: information of at least one channel of the color image of the face samples.

In accordance with the seventh possible implementation of the second aspect of the present invention, in an eighth possible implementation of the second aspect of the present invention, the apparatus also includes a second processing module, the second processing module is configured to perform identical second processing on the information of at least one channel of the color image of the face samples before the color image of the multiple face samples is trained by the neural network, the second processing module includes at least one of the following sub-modules: a second rotating sub-module, a second transforming sub-module, a second aligning sub-module, a second contrast stretching sub-module and a second normalizing sub-module; the second rotating sub-module is configured to determine feature points of the information of the at least one channel of the color image of the face samples, and rotating the information of the at least one channel of the color image of the face samples based on the feature points; the second transforming sub-module is configured to perform mirroring, linear transformation and affine transformation on the information of the at least one channel of the color image of the face samples; the second aligning sub-module is configured to align the feature points of the information of the at least one channel of the color image of the face samples to a set position; the second contrast stretching sub-module is configured to perform contrast stretching on the information of the at least one channel of the color image of the face samples; and the second normalizing sub-module is configured to normalize the information of the at least one channel of the color image of the face samples with respect to pixel values of the image.

In accordance with the eighth possible implementation of the second aspect of the present invention, in a ninth possible implementation of the second aspect of the present invention, the second normalizing sub-module is specifically configured to normalize the information of the at least one channel of the color image of the face samples with respect to a pixel value from [0,255] to [0,1].

In accordance with any possible implementation of the second aspect of the present invention from the seventh possible implementation to the ninth possible implementation, in a tenth possible implementation of the second aspect of the present invention, the face samples carry at least one of the following facial categories: gender, race, age range and age value; the face samples and the information of the at least one channel of the color image of the face samples carry a same one of the facial categories respectively.

In accordance with any possible implementation of the second aspect of the present invention from the seventh possible implementation to the tenth possible implementation, in an eleventh possible implementation of the second aspect of the present invention, the neural network also includes cost functions carried by the face samples and corresponding to the different facial categories respectively; the neural network also includes a first cost function that includes a weighted sum of the cost functions corresponding to the different facial categories.

In accordance with any possible implementation of the second aspect of the present invention from the tenth possible implementation to the eleventh possible implementation, in a twelfth possible implementation of the second aspect of the present invention, the facial category included in the neural network includes at least one of: gender, race, age range and age value.

In accordance with any possible implementation of the second aspect of the present invention from the fifth possible implementation to the twelfth possible implementation, in a thirteenth possible implementation of the second aspect of the present invention, the feature points are eye points.

In accordance with the second aspect of the present invention and any possible implementation of the second aspect of the present invention from the first possible implementation to the thirteenth possible implementation, in a fourteenth possible implementation of the second aspect of the present invention, the neural network includes a convolution neural network.

In accordance with the fourteenth possible implementation of the second aspect of the present invention, in a fifteenth possible implementation of the second aspect of the present invention, the convolution neural network includes one input layer, three group layers, two fully connected layers and four output layers; and each of the group layers includes a convolution layer, an activation layer and a lower sampling layer.

In accordance with the second aspect of the present invention and any possible implementation of the second aspect of the present invention from the first possible implementation to the fifteenth possible implementation, in a sixteenth possible implementation of the second aspect of the present invention, the information of the at least one channel of the color image of the face samples is information of three channels of an RGB-formated color image of the face samples, or information of three channels of a YUV-formatted color image of the face samples.

In accordance with a third aspect of the present invention, a computer readable storage medium is provided, the computer readable storage medium is stored with a computer program, where the computer program performs a step of the method according to the first aspect of the present invention or any possible implementation from the first possible implementation to the sixteenth possible implementation of the first aspect of the present invention.

In accordance with a fourth aspect of the present invention, an apparatus for face classification is provided, including a memory, second processor and a computer program stored in the memory and executable on the second processor, where the computer program performs a step of the method according to the first aspect of the present invention or any possible implementation from the first possible implementation to the sixteenth possible implementation of the first aspect of the present invention when executed by a second processor.

A method and an apparatus for face classification provided in the present invention can reclude the work for artificial classification by analyzing facial attributes through contents of facial images as well as efficiently and automatically classifying a plenty of face-included images in accordance with facial attributes thereof, allowing the face-included images to be stored more clearly and orderly, thereby improving classification efficiency.

DESCRIPTION OF EMBODIMENTS

Technical solutions in the embodiments of the present invention will be described hereunder detailedly in conjunction with drawings in the embodiments of the present invention.

Terms such as "first", "second" and the like in the specification and claims of the present invention as well as in the described drawings are intended to distinguish different objects, but not intended to define a particular order.

The term such as "and/or" in the embodiments of the present invention is merely used to describe an association between associated objects, which indicates that there may be three relationships, for example, A and/or B may indicate presence of A only, of both A and B, and of B only.

In the embodiments of the present invention, expressions such as "exemplary" or "for example" are used to indicate illustration of an example or an instance. In the embodiments of the present invention, any embodiment or design scheme described as "exemplary" or "for example" should not be interpreted as preferred or advantageous over other embodiments or design schemes. In particular, the use of "exemplary" or "for example" is aimed at presenting related concepts in a specific manner.

It should be noted that, for the sake of conciseness and clarity of illustration, elements shown in the drawings are not necessarily drawn to scale. For example, for the sake of clarity, dimensions of some elements may be increased relative to other elements. In addition, reference numerals may be repeated among the drawings where necessary to indicate that corresponding or similar elements target at the same issue.

It should be noted that, since a video or the like consists of several images, a processing method pertaining to images, imaging and images that is described in the embodiments of the present invention may be applied in aspects in terms of the video, and those skilled in the art may modify, without any creative effort, the method revealed in the present invention into a processing method applicable to videos or the like, thus the modified method falls into the protection scope of the present invention.

Embodiments of the present invention are described in detail by taking a human face as an example, technical solutions in the present invention are also applicable to face classification of different objects, such as face classification of different animals or of target objects with attributes similar to those of human faces.

Figure 1:
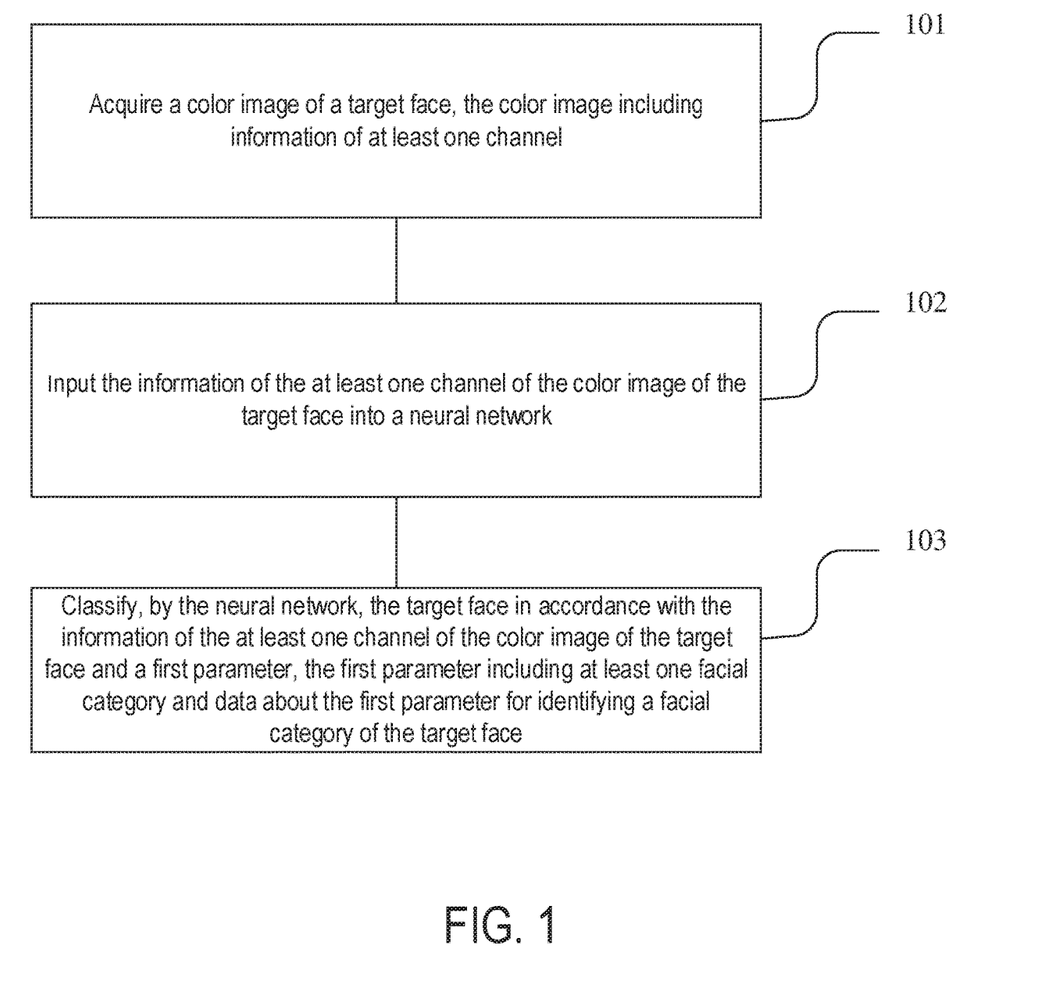
FIG. 1 is a flowchart of a method for face classification according to a first embodiment of the present invention.

A method for face classification according to a first embodiment of the present invention will be described hereunder specifically in conjunction with FIG. 1. As shown in FIG. 1, the method includes:

Step 101, acquiring a color image of a target face, the color image including information of at least one channel.

Optionally, the acquiring step may be a step of acquiring, from a memory, a color image of a target face taken by a camera apparatus.

Optionally, the information of the at least one channel of the color image of the target face includes three channels of an RGB-formated color image of the target face, or three channels of a YUV-formatted color image of the target face.

Step 102, inputting the information of the at least one channel of the color image of the target face into a neural network.

Optionally, what is inputted into the neural network may be the color image of the target face or may be three channels of an RGB-formated color image of the target face, or three channels of a YUV-formatted color image of the target face.

Optionally, the above-described neural network includes a convolution neural network that includes one input layer, three group layers, two fully connected layers and four output layers, and each of the group layers includes a convolution layer, an activation layer and a lower sampling layer.

Step 103, classifying, by the neural network, the target face in accordance with the information of the at least one channel of the color image of the target face and a first parameter, the first parameter including at least one facial category and data about the first parameter for identifying the category of the target face. A multidimensional output vector is obtained after the at least one channel of the color image is inputted into the convolution neural network, and the multidimensional output vector is inputted into the different fully connected layers and output layers of the neural network to successively obtain output results pertaining to the target face, such as age, gender, race of the target face.

The above-described neural network includes the above-described first parameter, and the facial category included in the first parameter includes at least one of: gender, race, age range and age value. Optionally, in an embodiment, the above-described first parameter includes gender, race, age range and age value as well as data about the first parameter for identifying the four categories. In the above-described parameters, the gender may be: male, female or unclear, with possible values of 0, 1, 2; the race may be: white, black, yellow or unclear, with possible values of 0, 1, 2, 3; the age range may be: [0, 5), [6, 15), [16, 25), [26, 35), [36, 48), [49, 60), [60, +∞), with possible values of 0, 1, 2, 3, 4, 5, 6; the age value may be any integer greater than or equal to 0.

Optionally, in a case where the above-described first parameter includes one facial category, the neural network may be configured to determine whether the above-described target face belongs to the facial category included in the first parameter.

Optionally, the above-described method also includes: placing the color image of the target face into at least one corresponding folder in accordance with results from the classification of the target face. The above-described at least one means that the color image of the target face may be placed into one folder or may be replicated into multiple folders representing corresponding attributes.

Illustratively, it is possible to create two folders regarding male and female, three folders regarding the white, the black and the yellow, and folders corresponding to the above-described 7 age ranges respectively. If final classification results of the color image of a certain target face is a white male with an age range of [36, 48) and an age value of 40, then the color image of the target face may be respectively replicated into three folders representing male, white, and an age range of [36, 48). In another embodiment, folders for three races regarding the black, the white and the yellow may be respectively created according to the different races, two folders regarding male and female are created under each race folder, and then 7 sub-folders regarding the above-described age ranges are respectively created under the male and female folders. If the final classification results of the color image of a certain target face is a white male with an age range of [36, 48) and an age value of 40, then the color image of the target face may be replicated into the folder representing the age range of [36, 48) under the male gender under the white race; or the color image of the target face may be replicated into the folder representing the white race, and into the folder representing male gender under the folder of the white race, and into the folder representing the age range of [36, 48) under the male gender under the white race.

Optionally, before inputting the information of the at least one channel of the color image of the target face into a neural network, the method also includes: determining, in accordance with at least one of the following parameters: a pitch angle, a drift angle, a roll angle, a dimension and light conditions, that the color image of the target face qualifies.

The determining, in accordance with at least one of the following parameters: a pitch angle, a drift angle, a roll angle, a dimension and light conditions, that the color image of the target face qualifies includes:

determining that the color image of the target face qualifies in accordance with at least one of the following parameters: the pitch angle smaller than or equal to a first angle; the drift angle smaller than or equal to a second angle; the roll angle smaller than or equal to a third angle; the number of pixels of the color image of the target face greater than or equal to a first threshold; and light intensity greater than or equal to a second threshold. Illustratively, the first angle may be 30°, the second angle may be 30°, the third angle may be 44°, the first threshold may be 40×40 pixels (pixels), and the second threshold may be 5 Lux (Lux). Optionally, the above-described first angle and the second angle may be the same or different.

The number of pixels of the color image of the target face being greater than or equal to a first threshold may include: the total number of pixels of the color image of the target face is greater than or equal to the first threshold, or the number of horizontal pixels of the color image of the target face is greater than or equal to the first threshold, or the number of vertical pixels of the color image of the target face is greater than or equal to the first threshold.

Optionally, when it is determined that the color image of the above-described target face is unqualified, stop the classification of the color image of the target face. When it is determined that the color image of the above-described target face qualifies, the steps of the feature point positioning and the first processing may be carried out.

Optionally, in order to deal with a case where postures of the obtained target face or light conditions are undesirable, at least one channel of the color image of the target face may be performed with identical first processing to approximately satisfy requirements for a standard face or requirements for use, specifically, before inputting the information of the at least one channel of the color image of the target face into a neural network, the method also includes: performing identical first processing on the information of the at least one channel of the color image of the target face, and the first processing includes at least one of: determining feature points of the information of the at least one channel of the color image of the target face, rotating the information of the at least one channel of the color image of the target face based on the feature points; performing mirroring, linear transformation and affine transformation on the information of the at least one channel of the color image of the target face; aligning the feature points of the information of the at least one channel of the color image of the target face to a set position; performing contrast stretching on the information of the at least one channel of the color image of the target face; and normalizing the information of the at least one channel of the color image of the target face with respect to values of the pixels of the image.

Illustratively, an embodiment is described by taking an example where, as described above, the color image of the target face is RGB-formatted, the above-described performing identical first processing on the information of the three channels of the RGB-formated color image of the target face may include: performing an identical linear transformation, an affine transformation and contrast stretching on information about a red channel, information about a green channel and information about a blue channel of the color image of the target face. Optionally, the above-described performing identical first processing on the information of the three channels of the color image of the target face may include: subjecting the color image of the target face to the above-described first processing after decomposing it into the information of the three channels firstly, or the case may also be that, firstly performing the above-described first processing on the overall color image of the target face, then decomposing the processed color image into the information of the three channels, and then inputting same into the neural network.

Optionally, the above-described feature points may be eye points or may be facial features such as tip points of a nose. The above-described set position at which the feature points of the information of the at least one channel are aligned may be feature points of a certain standard facial image, such as eye points, or may be a predetermined position, or feature points that the inputted face samples are uniformly aligned during the training performed by the above-described neural network, such as eye points.

Optionally, the above-described performing contrast stretching on the information of the at least one channel may include performing segmented contrast stretching on the information of the at least one channel of the color image of the target face in accordance with characteristics of the color image of the target face, or may include performing segmented contrast stretching on a pixel value in accordance with the pixel values of the information of the at least one channel of the target face.

Optionally, the normalizing the information of the at least one channel of the color image of the target face with respect to values of the pixels of the image includes: normalizing each channel of the color image of the target face with respect to a pixel value from [0,255] to [0,1]. The above-described channels may include: three channels of the RGB-formated color image of the target face or three channels of the YUV-formatted color image of the target face.

Generally, take a human face as an example, besides the face, a color image of the target human face captured by a camera apparatus also includes redundant parts such as a neck and shoulders, and a human face detection is required for positioning a frame position of the human face, then fetch the frame position, and then position the above-described facial features, such as the eye points, to enable the above-described first processing, such as affine transformation, rotation and alignment of the feature points, so as to reach or approximately reach requirements for a standard face or requirements for use. The above-described requirements involve positions and dimensions of the feature points, for example, the positions of the feature points may be aligned with positions of feature points of the standard face or a face sample, and/or the dimensions may be the same as or similar to those of the standard face or the face sample.

Optionally, the above-described data about the first parameter for identifying the category of the target face is obtained from a color image of multiple face samples that is trained by the neural network, and the color image of the face samples includes: information of at least one channel of the color image of the face samples. The information of the at least one channel of the color image of the face samples is information of three channels of an RGB-formated color image of the face samples, or information of three channels of a YUV-formatted color image of the face samples. Specifically, the color image of the face samples is RGB-formated, information of red, green and blue channels of the face samples may be inputted into the above-described neural network, the neural network uses a gradient descent method and a back-propagation algorithm for iteration to train the neural network. Optionally, the face samples carry at least one of the following facial categories: gender, race, age range and age value, the face samples and the information of the at least one channel of the color image of the face samples carry the same facial category respectively. The above-described neural network may determine a parametric combination for identifying the category of the face samples with high accuracy through the above-described iterative procedure for identifying the category of the face samples, for instance, a weighting value of at least one node of the neural network serves as the first parameter for identifying the category of the target face, and reference may be made to the above descriptions for specific contents of the first parameter. Optionally, the first parameter may be obtained through offline training of the above-described face samples, and a product providing practical application for use in identification of facial category may not include the above-described face samples.

Optionally, in order to deal with a case where postures of the obtained face samples or light conditions are undesirable, at least one channel of the color image of the face samples may be performed with identical second processing to approximately satisfy requirements for a standard face or requirements for use, specifically, for instance, before the color image of the multiple face samples is trained by the neural network, the method also includes: performing identical second processing on the information of the at least one channel of the color image of the face samples, the second processing includes at least one of: determining feature points of the information of the at least one channel of the color image of the face samples, rotating the information of the at least one channel of the color image of the face samples based on the feature points; performing mirroring, linear transformation and affine transformation on the information of the at least one channel of the color image of the face samples; aligning the feature points of the information of the at least one channel of the color image of the face samples to a set position; performing contrast stretching on the information of the at least one channel of the color image of the face samples; and normalizing the information of the at least one channel of the color image of the face samples with respect to values of the pixels of the image. The above-described second processing may be the same as or different from the first processing.

Illustratively, an embodiment is described by taking an example where the color image of the face samples is RGB-formated, the performing identical second processing on the information of the at least one channel of the color image of the face samples may include: performing the above-described linear transformation, affine transformation and contrast stretching on the red channel, the green channel and the blue channel of the color image of the above-described face samples with the same parameter. Optionally, the above-described performing identical second processing on the information of the three channels of the color image of the face samples may include: performing the above-described second processing on the at least one channel of the color image of the face samples, then inputting information of each channel subjected to the second processing into the neural network for training; or the case may also be that, firstly performing the above-described second processing on the overall image of the color image of the face samples, then decomposing the processed color image into each channel, and then inputting same into the neural network for training.

Optionally, the above-described feature points may be eye points or may be facial features such as tip points of a nose. The above-described set position at which the feature points of the color image of multiple face samples are aligned may be feature points of a certain standard facial image, such as eye points, or may be a predetermined position or feature points that inputted face samples are uniformly aligned during the training performed by the above-described neural network, such as eye points.

Optionally, the above-described performing contrast stretching on the at least one channel of the color image of the face samples may include performing segmented contrast stretching on the at least one channel of the color image of the face samples in accordance with characteristics of the at least one channel of the color image of the face samples, or may include performing segmented contrast stretching on a pixel value in accordance with the pixel values of the at least one channel of the color image of the face samples.

Optionally, the normalizing the information of the at least one channel of the color image of the face samples with respect to values of the pixels of the image includes: normalizing the information of the at least one channel of the color image of the face samples with respect to a pixel value from [0,255] to [0,1].

Before performing the second processing, it is also possible to determine that the color images of the face samples qualify in accordance with at least one of the following parameters: a pitch angle, a drift angle, a roll angle, a dimension and light conditions. Specifically, the standard for determination may be: the pitch angle smaller than or equal to a first angle, the drift angle smaller than or equal to a second angle, the roll angle smaller than or equal to a third angle, the number of pixels of the color image of the target face greater than or equal to a first threshold, and light intensity greater than or equal to a second threshold. Illustratively, the first angle may be 30°, the second angle may be 30°, the third angle may be 44°, the first threshold may be 40×40 pixels (pixels), and the second threshold may be 5 Lux (Lux).

The number of pixels of the color image of the face sample being greater than or equal to a first threshold may include: the total number of pixels of the color image of the face samples is greater than or equal to the first threshold, or the number of horizontal pixels of the color image of the face samples is greater than or equal to the first threshold, or the number of vertical pixels of the color image of the face samples is greater than or equal to the first threshold.

Optionally, when it is determined that the color images of the above-described face samples are unqualified, stop the inputting of the color image of the face samples into the neural network for training. Optionally, the above-described first angle and second angle may be the same or different. When it is determined that the color images of the above-described face samples qualify, the steps of the feature point positioning and the second processing may be carried out.

Generally, take a human face as an example, besides the face, a color image of the face samples captured by a camera apparatus also includes redundant parts such as a neck and shoulders, and a human face detection is required for positioning a frame position of the human face, then fetch the frame position, and then position the above-described facial features, such as the eye points, to enable the above-described second processing, such as affine transformation, rotation and alignment of the feature points, so as to reach or approximately reach requirements for a standard face or requirements for use. The above-described requirements involve positions and dimensions of the feature points, for example, the positions of the feature points may be aligned with positions of feature points of a certain face sample, and/or the dimensions may be the same as or similar to those of the standard face or the face samples.

During use of a convolution neural network for training, a gradient descent method and a back-propagation algorithm are used to train the convolution neural network, and to optimize each parameter in the convolution neural network. The convolution neural network has a structure of one input layer, three group layers, two fully connected layers and four output layers. Each of the group layers includes a convolution layer, an activation layer and a lower sampling layer. Optionally, a face sample with a dimension of 60*60 subjected to the above-described second processing is inputted into the convolution neural network. An activation function of the convolution layer uses an ReLU function. Multiplying the input of each convolution layer by the weight of the layer to obtain a value, the ReLU function follows a principle that, if the value is greater than 0, then the calculated value will be saved as an output value, if the value is smaller than 0, then the output value is set to 0. Surely, the ReLU function may also be replaced with other activation functions. The fully connected layers also use the ReLU activation function. The output layers serve to convert a value generated from the fully connected layers into a probability between [0,1].

During a training stage, inputting each of the multiple face samples into the convolution neural network, and calculating an output to determine the disparity between the output result and a desirable output result. This process is called "forward propagation" Forward. Then determining the error degree of the model parameter for the convolution neural network in accordance with the difference between the output result and the desirable result, thus conducting learning of the convolution neural network in accordance with an error correction model parameter, this process is called "back propagation" Backward. Adjustment of the weight value of each layer in the convolution neural network allows a gap between the output value of the convolution neural network and a value of a facial category of a practical face sample to be smaller and smaller till they become consistent or the minimum gap is kept at a stable level, thereby obtaining a desirable convolution neural network and a first parameter included therein.

Optionally, the neural network also includes cost functions carried by the face samples and corresponding to the different facial categories respectively; the neural network also includes a first cost function that includes a weighted sum of the cost functions corresponding to the different facial categories.

The cost functions (cost function) need to compare a value of a single outputted facial category with category values of the face samples. In the neural network of the present invention, the cost functions use values of multiple facial categories to compare with corresponding categories of the face samples, respectively, so as to obtain a cost function for each facial category, then to perform weighting on the cost functions of the multiple facial categories to obtain an overall cost function, that is to say, from the perspective of the cost functions of the convolution neural network, each facial category is taken into account, and the training targets at making lowest overall error for all facial categories. This fashion supports a combination of various types of different facial categories. For example, the cost functions for age, gender and race are respectively $L\_Age$, $L\_Gender$, $L\_Race$, and when there is a need to output attributes of both age and gender, the overall cost function is L_All=a*L_Age+b*L_Gender. When there is a need to output attributes of age, gender and race, the overall cost function is L_All=a*L_Age+b*L_Gender+c*L_Race, if the age value of the facial category is added, then the overall cost function is L_=a*L_Age+b*L_Gender+c*L_Race+ d*L_Agevalue.

The method for face classification provided in the present invention can reduce the work for artificial classification by analyzing facial attributes through contents of facial images as well as efficiently and automatically classifying a plenty of face-included images in accordance with facial attributes thereof, allowing the face-included images to be stored more clearly and orderly, thereby improving classification efficiency.

Figure 2:
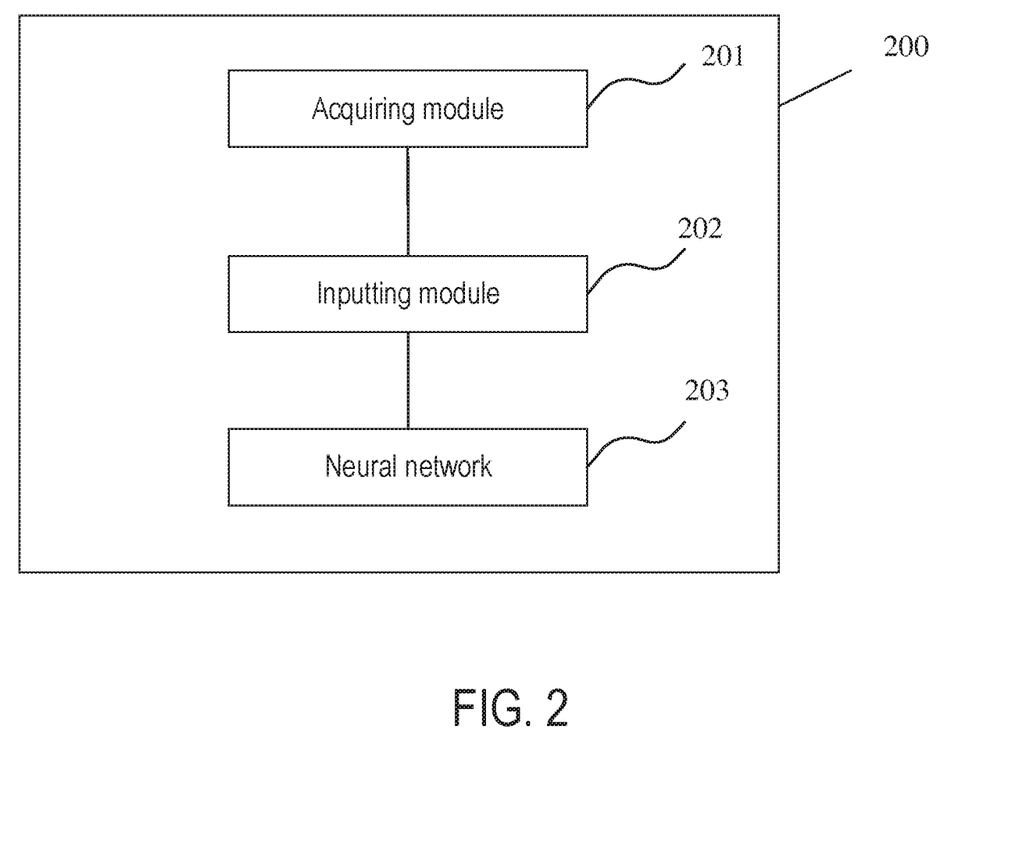
FIG. 2 is a flowchart of another method for face classification according to a second embodiment of the present invention.

An apparatus 200 for face classification according to a second embodiment of the present invention will be described hereunder specifically in conjunction with FIG. 2. As shown in FIG. 2, the apparatus 200 includes:

An acquiring module 201 configured to acquire a color image of a target face, where the color image includes information of at least one channel.

Optionally, the acquiring module 201 may acquire, from a memory, a color image of a target face captured by a camera apparatus.

Optionally, the information of the at least one channel of the color image of the target face includes three channels of an RGB-formated color image of the target face, or three channels of a YUV-formatted color image of the target face.

An inputting module 202 configured to input the information of the at least one channel of the color image of the target face into a neural network 203.

Optionally, what is inputted into the neural network may be the color image of the target face or may be three channels of an RGB-formated color image of the target face, or three channels of a YUV-formatted color image of the target face.

Optionally, the above-described neural network 203 includes a convolution neural network that includes one input layer, three group layers, two fully connected layers and four output layers, and each of the group layers includes a convolution layer, an activation layer and a lower sampling layer.

The neural network 203 configured to perform a classification on the target face in accordance with the information of the at least one channel of the color image of the target face and a first parameter, the first parameter including at least one facial category and data about the first parameter for identifying the category of the target face. A multidimensional output vector is obtained after the at least one channel of the color image is inputted into the convolution neural network, and the multidimensional output vector is inputted into the different fully connected layers and output layers of the convolution neural network to successively obtain output results pertaining to the target face, such as age, gender, race of the target face.

The above-described neural network 203 includes the above-described first parameter, and the facial category included in the first parameter includes at least one of: gender, race, age range and age value. Optionally, in an embodiment, the above-described first parameter includes gender, race, age range and age value as well as data about the first parameter for identifying the four facial categories. In the above-described parameters, the gender may be: male, female or unclear, with possible values of 0, 1, 2; the race may be: white, black, yellow or unclear, with possible values of 0, 1, 2, 3; the age range may be: [0, 5), [6, 15), [16, 25), [26, 35), [36, 48), [49, 60), [60, +∞), with possible values of 0, 1, 2, 3, 4, 5, 6; the age value may be any integer greater than or equal to 0.

Optionally, in a case where the above-described first parameter includes one facial category, the neural network 203 may be configured to determine whether the above-described target face belongs to the facial category included in the first parameter.

Optionally, the apparatus also includes an image classification placing module that is configured to place the color image of the target face into at least one corresponding folder in accordance with results from the classification of the target face. The above-described at least one means that the image classification placing module may place the color image of the target face into one folder or may replicate the color image in multiple folders representing corresponding attributes.

Illustratively, it is possible to create two folders regarding male and female, three folders regarding the white, the black and the yellow, and folders corresponding to the above-described 7 age ranges, respectively. If final classification results of the color image of a certain target face is a white male with an age range of [36, 48) and an age value of 40, then the color image of the target face may be respectively replicated into three folders representing male, white, and an age range of [36, 48). In another embodiment, folders for three races regarding the black, the white, and the yellow may be respectively created according to the different races, two folders regarding male and female are created under each race folder, and then 7 sub-folders regarding the above-described age ranges are respectively created under the male and female folders. If the final classification results of the color image of a certain target face is a white male with an age range of [36, 48) and an age value of 40, then the color image of the target face may be replicated into the folder representing the age range of [36, 48) under the male gender under the white race; or the color image of the target face may be replicated into the folder representing the white race, and into the folder representing the age range of [36, 48) under the male gender under the white race.

Optionally, the apparatus also includes an image qualification determining module that is configured to determine, in accordance with at least one of the following parameters: a pitch angle, a drift angle, a roll angle, a dimension and light conditions, that the color image of the target face qualifies before the inputting module inputs the information of the at least one channel of the color image of the target face into the neural network.

The image qualification determining module is specifically configured to determine that the color image of the target face qualifies in accordance with at least one of the following parameters: the pitch angle smaller than or equal to a first angle; the drift angle smaller than or equal to a second angle; the roll angle smaller than or equal to a third angle; the number of pixels of the color image of the target face greater than or equal to a first threshold; and light intensity greater than or equal to a second threshold. Illustratively, the first angle may be 30°, the second angle may be 30°, the third angle may be 44°, the first threshold may be 40×40 pixels (pixel), the second threshold may be 5 Lux (Lux).

The number of pixels of the color image of the target face being greater than or equal to a first threshold may include: the total number of pixels of the color image of the target face is greater than or equal to the first threshold, or the number of horizontal pixels of the color image of the target face is greater than or equal to the first threshold, or the number of vertical pixels of the color image of the target face is greater than or equal to the first threshold.

Optionally, when the image qualification determining module determines that the color image of the above-described target face is unqualified, stop the classification of the color image of the target face. When the image qualification determining module determines that the color image of the above-described target face qualifies, the steps of the feature point positioning and the first processing may be carried out.

Optionally, in order to deal with a case where postures of the captured target face or light conditions are undesirable, at least one channel of the color image of the target face may be performed with identical first processing to approximately satisfy requirements for a standard face or requirements for use, specifically, the apparatus also includes a first processing module configured to perform identical first processing on the information of the at least one channel of the color image of the target face, before the inputting module inputs the information of the at least one channel of the color image of the target face into a neural network, and the first processing module includes at least one of the following sub-modules: a first rotating sub-module, a first transforming sub-module, a first aligning sub-module, a first contrast stretching sub-module and a first normalizing sub-module.

The first rotating sub-module is configured to determine feature points of the information of the at least one channel of the color image of the target face, rotating the information of the at least one channel of the color image of the target face based on the feature points; the first transforming sub-module is configured to perform mirroring, linear transformation and affine transformation on the information of the at least one channel of the color image of the target face; the first aligning sub-module is configured to align the feature points of the information of the at least one channel of the color image of the target face to a set position; the first contrast stretching sub-module is configured to perform contrast stretching on the information of the at least one channel of the color image of the target face; and the first normalizing sub-module is configured to normalize the information of the at least one channel of the color image of the target face with respect to values of the pixels of the image.

Illustratively, an embodiment is described by taking an example where, as described above, the color image of the target face is RGB-formatted, the above-described first processing module may specifically be configured to perform an identical linear transformation, an affine transformation and contrast stretching on information about a red channel, information about a green channel and information about a blue channel of the color image of the target face. Optionally, the above-described first processing module may be specifically configured to subject the color image of the target face to the above-described first processing after decomposing it into the information of the three channels firstly, or perform the above-described first processing on the color image of the target face as a whole firstly, then decompose the processed color image into the information of the three channels, and then input same into the neural network.

Optionally, the above-described feature points may be eye points or may be facial features such as tip points of a nose. The above-described set position at which the feature points of the information of the at least one channel are aligned may be feature points of a certain standard facial image, such as eye points, or may be a predetermined position, or feature points that the inputted face samples are uniformly aligned during the training performed by the above-described neural network, such as eye points.

Optionally, the first contrast stretching sub-module is specifically configured to perform segmented contrast stretching on the information of the at least one channel of the color image of the target face in accordance with characteristics of the color image of the target face, or perform segmented contrast stretching on a pixel value in accordance with the pixel values of the information of the at least one channel of the target face.

Optionally, the first normalizing sub-module is specifically configured to normalize each channel of the color image of the target face with respect to a pixel value from [0,255] to [0,1]. The above-described channels may include: three channels of the RGB-formatted color image of the target face, or three channels of the YUV-formatted color image of the target face.

Generally, take a human face as an example, besides the face, a color image of the target human face captured by a camera apparatus also includes redundant parts such as a neck and shoulders, and a human face detection is required for positioning a frame position of the human face, then fetch the frame position, and then position of the above-described facial features, such as the eye points, to enable the first processing module to perform the above-described first processing, such as affine transformation, rotation and alignment of the feature points, so as to reach or approximately reach requirements for a standard face or requirements for use. The above-described requirements involve positions and dimensions of the feature points, for example, the positions of the feature points may be aligned with positions of feature points of the standard face or a face sample, and/or the dimensions may be the same as or similar to those of the standard face or the face sample.

Optionally, the above-described data about the first parameter for identifying the category of the target face is obtained from a color image of multiple face samples that is trained by the neural network, and the color image of the face samples includes: information of at least one channel of the color image of the face samples. The information of the at least one channel of the color image of the face samples is information of three channels of an RGB-formatted color image of the face sample, or information of three channels of a YUV-formatted color image of the face samples.

Specifically, the color image of the face samples is RGB-formatted, information of red, green and blue channels of the face samples may be inputted into the above-described neural network 203 by an inputting module 202, the neural network 203 uses a gradient descent method and a back-propagation algorithm for iteration to train the neural network. Optionally, the face samples carry at least one of the following facial categories: gender, race, age range and age value, the face samples and the information of the at least one channel of the color image of the face samples carry the same facial category respectively. The above-described neural network 203 may determine a parametric combination for identifying the category of the face samples with high accuracy through the above-described iterative procedure for identifying the category of the face samples, for instance, a weighting value of at least one node of the neural network serves as the first parameter for identifying the category of the target face, and reference may be made to the above descriptions for specific contents of the first parameter. Optionally, the first parameter may be obtained through offline training of the above-described face sample, and a product providing practical application for use in identification of facial category may not include the above-described face sample.

Optionally, in order to deal with a case where postures of the obtained face samples or light conditions are undesirable, at least one channel of the color image of the face samples may be performed with identical second processing to approximately satisfy requirements for a standard face or requirements for use, specifically, for instance, the apparatus also includes a second processing module that is configured to perform identical second processing on the information of the at least one channel of the color image of the face samples before the color image of the multiple face samples is trained by the neural network, the second processing module includes at least one of the following sub-modules: a second rotating sub-module, a second transforming sub-module, a second aligning sub-module, a second contrast stretching sub-module and a second normalizing sub-module.

The second rotating sub-module is configured to determine feature points of the information of the at least one channel of the color image of the face samples, and rotating the information of the at least one channel of the color image of the face samples based on the feature points; the second transforming sub-module is configured to perform mirroring, linear transformation and affine transformation on the information of the at least one channel of the color image of the face samples; the second aligning sub-module is configured to align the feature points of the information of the at least one channel of the color images of the face samples to a set position; the second contrast stretching sub-module is configured to perform contrast stretching on the information of the at least one channel of the color image of the face samples; and the second normalizing sub-module is configured to normalize the information of the at least one channel of the color image of the face samples with respect to values of the pixels of the image.

Illustratively, the above-described second processing module is specifically configured to perform the above-described linear transformation, affine transformation and contrast stretching on the red channel, the green channel and the blue channel of the color image of the above-described face samples with the same parameter. The above-described second processing module is specifically configured to perform the above-described second processing on the at least one channel of the color image of the face samples, then input information of each channel subjected to the second processing into the neural network for training; or the case may also that, firstly perform the above-described second processing on the overall image of the color image of the face samples, then decompose the processed color image into each channel, and then input same into the neural network for training.

Optionally, the above-described feature points may be eye points or may be facial features such as tip points of a nose. The above-described set position at which the feature points of the color image of multiple face samples are aligned may be feature points of a certain standard facial image, such as eye points, or may be a predetermined position or feature points that inputted face samples are uniformly aligned during the training performed by the above-described neural network, such as eye points.

Optionally, the second contrast stretching sub-module is specifically configured to perform segmented contrast stretching on the at least one channel of the color image of the face samples in accordance with characteristics of the at least one channel of the color image of the face samples, or may be configured to perform segmented contrast stretching on a pixel value in accordance with the pixel values of the at least one channel of the color image of the face samples.

The second normalizing sub-module is specifically configured to normalize the information of the at least one channel or each channel of the color image of the face samples with respect to a pixel value from [0,255] to [0,1].

Optionally, the above-described image qualification determining module may also be configured to determine that the color images of the face samples qualify in accordance with at least one of the following parameters: a pitch angle, a drift angle, a roll angle, a dimension and light conditions. Specifically, the standard for determination may be: the pitch angle smaller than or equal to a first angle, the drift angle smaller than or equal to a second angle, the roll angle smaller than or equal to a third angle, the number of pixels of the color image of the target face greater than or equal to a first threshold, and light intensity greater than or equal to a second threshold. Illustratively, the first angle may be 30°, the second angle may be 30°, the third angle may be 44°, the first threshold may be 40×40 pixels (pixels), and the second threshold may be 5 Lux (Lux).

The number of pixels of the color image of the face samples being greater than or equal to a first threshold may include: the total number of pixels of the color image of the face samples is greater than or equal to the first threshold, or the number of horizontal pixels of the color image of the face samples is greater than or equal to the first threshold, or the number of vertical pixels of the color image of the face samples is greater than or equal to the first threshold.

Optionally, when it is determined that the color images of the above-described face samples are unqualified, the above-described image qualification determining module may also be configured to stop the inputting of the color image of the face samples into the neural network for training. Optionally, the above-described first angle and second angle may be the same or different. When it is determined that the color images of the above-described face samples qualify, the steps of the feature point positioning and the second processing may be carried out.

Generally, take a human face as an example, besides the face, a color image of face samples captured by a camera apparatus also includes redundant parts such as a neck and shoulders, and a human face detection is required for positioning a frame position of the human face, then fetch the frame position, and then position the above-described facial features, such as the eye points, to enable the above-described second processing module to perform the above-described second processing, such as affine transformation, rotation and alignment of the feature points, so as to reach or approximately reach requirements for a standard face or requirements for use. The above-described requirements involve positions and dimensions of the feature points, for example, the positions of the feature points may be aligned with positions of feature points of a certain face sample, and/or the dimensions may be the same as or similar to those of the standard face or the face samples.

The above-described neural network is specifically configured to use a gradient descent method and a back-propagation algorithm to train the convolution neural network, and to optimize each parameter in the convolution neural network. The convolution neural network has a structure of one input layer, three group layers, two fully connected layers and four output layers. Each of the group layers includes a convolution layer, an activation layer and a lower sampling layer. Optionally, a face sample with a dimension of 60*60 subjected to the above-described second processing is inputted into the convolution neural network. An activation function of the convolution layer uses an ReLU function. Multiplying the input of each convolution layer by the weight of the layer to obtain a value, the ReLU function follows a principle that, if the value is greater than 0, then the calculated value will be saved as an output value, if the value is smaller than 0, then the output value is set to 0. Surely, the ReLU function may also be replaced with other activation functions. The fully connected layers also use the ReLU activation function. The output layers serve to convert a real value generated from the fully connected layers into a probability between [0,1].

During a training stage, inputting each of the multiple face samples into the convolution neural network, and calculating an output to determine the disparity between the output result and a desirable output result. This process is called "forward propagation" Forward. Then determining the error degree of the model parameter for the convolution neural network in accordance with the difference between the output result and the desirable result, thus conducting learning of the convolution neural network in accordance with an error correction model parameter, this process is called "back propagation" Backward. Adjustment of the weight value of each layer in the convolution neural network allows a gap between the output value of the convolution neural network and a value of a facial category of a practical face sample to be smaller and smaller till they become consistent or the minimum gap is kept at a stable level, thereby obtaining a desirable convolution neural network and a first parameter included therein.

Optionally, the neural network 203 also includes cost functions carried by the face samples and corresponding to the different facial categories respectively; the neural network 203 also includes a first cost function that includes a weighted sum of the cost functions corresponding to the different facial categories.

The cost functions (cost function) need to compare a value of a single outputted facial category with category values of the face samples. In the neural network 203 of the present invention, the cost functions use values of multiple facial categories to compare with corresponding categories of the face samples, respectively, so as to obtain a cost function for each facial category, then to perform weighting on the cost functions of the multiple facial categories to obtain an overall cost function, that is to say, from the perspective of the cost functions of the convolution neural network, each facial category is taken into account, and the training targets at making lowest overall error for all facial categories. This fashion supports a combination of various types of different facial categories. For example, the cost functions for age, gender and race are respectively L_Age, L_Gender, L_Race, and when there is a need to output attributes of both age and gender, the overall cost function is L_All=a*L_Age+b*L_Gender. When there is a need to output attributes of age, gender and race, the overall cost function is L_All=a*L_Age+b*L_Gender+c*L_Race, if the age value of the facial category is added, then the overall cost function is L_All=a*L_Age+b*L_Gender+c*L_Race+d*L_Agevalue.

The apparatus for face classification provided in the present invention can reduce the work for artificial classification by analyzing facial attributes through contents of facial images as well as efficiently and automatically classifying a plenty of face-included images in accordance with facial attributes thereof, allowing the face-included images to be stored more clearly and orderly, thereby improving classification efficiency.

Figure 3:
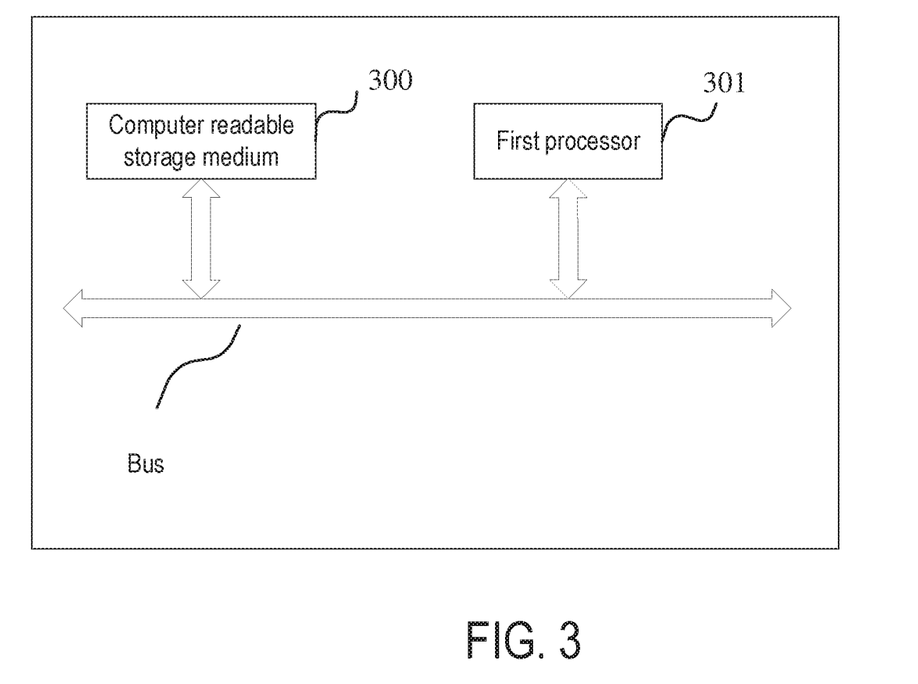
FIG. 3 is a structural diagram of an apparatus for face classification according to a third embodiment of the present invention.

A computer readable storage medium 300 provided in an embodiment of the present invention will be detailed hereunder detailedly in conjunction with FIG. 3, the computer readable storage medium 300 is stored with a computer program that performs a step of the method according to the first embodiment when executed by a first processor 301.

The computer readable storage medium 300 provided in the present invention can reduce the work for artificial classification by analyzing facial attributes through contents of facial images as well as efficiently and automatically classifying a plenty of face-included images in accordance with facial attributes thereof, allowing the face-included images to be stored more clearly and orderly, thereby improving classification efficiency.

Figure 4:
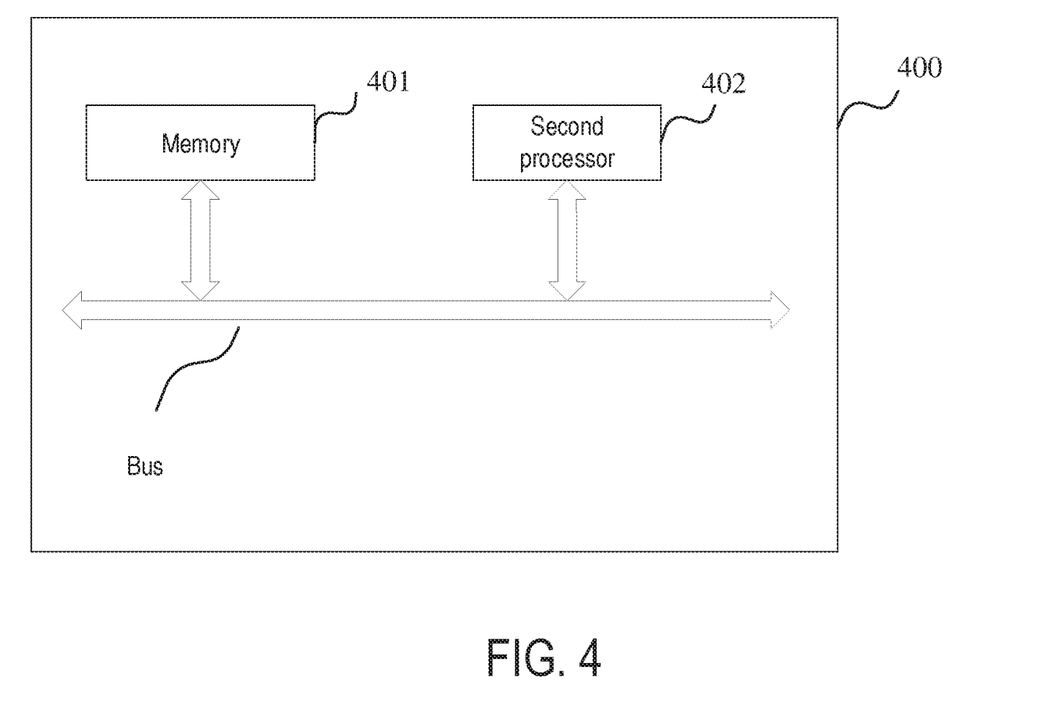
FIG. 4 is a structural diagram of an apparatus for face classification according to a fourth embodiment of the present invention.

An apparatus 400 for face classification provided in an embodiment of the present invention will be described hereunder detailedly in conjunction with FIG. 4, the apparatus 400 includes a memory 401, a second processor 402 and a computer program stored in the memory 401 and executable on the second processor 402, where the computer program performs a step of the method according to the first embodiment when executed by the second processor 402.

The apparatus 400 for face classification provided in the present invention can reduce the work for artificial classification by analyzing facial attributes through contents of facial images as well as efficiently and automatically classifying a plenty of face-included images in accordance with facial attributes thereof, allowing the face-included images to be stored more clearly and orderly, thereby improving classification efficiency.

Illustratively, the computer program may be divided into one or more modules/units that are stored in the memory and executed by the processor to implement the present invention. The one or more modules/units may be a series of segments of computer program instructions capable of fulfilling a specific function, the segments of instructions are used to describe an execution process of the computer program in the apparatus/terminal device.

The apparatus/terminal device may be a calculating device such as a mobile phone, a tablet computer, a desk-top computer, a laptop, a palm computer or a cloud server. The apparatus/terminal device may include but is not limited to, a process and a memory. Those skilled in the art will appreciate that, the drawings in the present invention are merely examples of the apparatus/terminal device rather than limiting the apparatus/terminal device, which may include more or less parts than in the drawings, or a combination of certain parts, or different parts, for example, the apparatus/terminal device may also include an input output device, a network access device, a bus and the like.

The above-described processor may be a central processing unit (Central Processing Unit, CPU) or other universal processors such as a digital signal processor (Digital Signal Processor, DSP), an application specific integrated circuit (Application Specific Integrated Circuit, ASIC), a field-programmable gate array (Field-Programmable Gate Array, FPGA) or other programmable logic devices such as a discrete gate or a transistor logic device, a discrete hardware component, etc. The universal processors may be a microprocessor, or the processor may be any regular processor or the like, the processor serves as a control center of the apparatus/terminal device, and uses various interfaces and circuits to connect the parts of the entire apparatus/terminal device.

The memory may be configured to store the computer program and/or the modules. The processor implements various functions of the apparatus/terminal device by running or executing the computer program and/or the modules stored in the memory and calling data stored in the memory. The memory may include a program storage area and a data storage area, where the program storage area may store an operation system, an application program required by at least one function (for example, an image playing function), and the like; the data storage area may store data created in accordance with the use of a mobile phone (for example, video data, images), etc. Furthermore, the memory may include a high rate random access memory, a nonvolatile memory, such as a hard disk, memory, a plug-in hard disk, a smart media card (Smart Media Card, SMC), a secure digital (Secure Digital, SD) card, a flash card (Flash Card), at least one magnetic disc memory device, a flash memory device or other volatile solid memory devices.

If embodied in the form of a software function unit and sold or used as an independent product, the modules/units integrated in the apparatus/terminal device may be stored on a computer readable storage medium. Based on such understanding, the present invention implements all or a part of procedures in the method according to the foregoing embodiments, which may also be implemented by a computer program instructing relevant hardware, and the computer program may be stored on a computer readable storage medium. When the computer program is executed by the processor, the steps in the method according to the embodiments may be performed. The computer program includes computer program codes that may be in the form of source codes, object codes, executable files or in some intermediate forms. The computer readable medium may include: any entity or apparatus capable of carrying the computer program codes, a recording medium, a USB flash disk, a mobile hard disk, a magnetic disk, an optical disk, a computer memory, a read-only memory (ROM, Read-Only Memory), a random access memory (RAM, Random Access Memory), an electric carrier signal, a telecommunication signal, a software distribution medium, etc.

Imaging of a target object in each of the foregoing embodiments may be local imaging or global imaging of the target object. For either the local imaging or the global imaging the method or the apparatus provided in the present invention are applicable, or the method or the apparatus provided in the present invention are applicable to a case after corresponding adjustments are made to the local imaging or the global imaging. The described adjustments require no creative effort by persons of ordinary skill in the art, and shall fall into the protection scope of the present invention.

What is claimed is:

1. A method for face classification, comprising:
    acquiring a color image of a target face, the color image comprising information of a plurality of channels;
    determining that the color image of the target face qualifies for inputting into a neural network in accordance with at least one of the following parameters: a pitch angle, a drift angle, a roll angle, and a dimension and light conditions;
    inputting the information of the plurality of channels of the color image of the target face into the neural network; and
    classifying, by the neural network, the target face in accordance with the information of the plurality of channels of the color image of the target face and a first parameter, the first parameter comprising at least one facial category and data about the first parameter for identifying a facial category of the target face,
    wherein, before inputting the information of the plurality of channels of the color image of the target face into the neural network, the method further comprises performing an identical first processing on the information of the plurality of channels of the color image of the target face, the first processing comprising:
        normalizing the information of each of the plurality of channels of the color image of the target face with respect to a pixel value of the color image from [0,255] to [0,1],
    wherein, before inputting the information of the plurality of channels of the color image of the target face into the neural network, the method further comprises:
        obtaining a multidimensional output vector; and
        inputting the multidimensional output vector to layers of the neural network to successively obtain output results pertaining to the target face,
    wherein, when the color image of the target face is determined to be not qualified, the method further comprises stopping inputting the color image into the neural network and stopping classification of the color image of the target face, and
    wherein the facial category of the target face included in the first parameter comprises gender, race, age range, and age value.

2. The method in accordance with claim 1, wherein the method further comprises placing the color image of the target face into at least one corresponding folder in accordance with a result from the classification of the target face.

3. The method in accordance with claim 1, wherein the information of the plurality of channels of the color image of the target face comprises information of three channels of an RGB-formatted or a YUV-formatted color image of the target face.

4. The method in accordance with claim 1, wherein the determining that the color image of the target face qualifies comprises determining at least one of the following:
    the pitch angle is smaller than or equal to a first angle; the drift angle is smaller than or equal to a second angle; the roll angle is smaller than or equal to a third angle;
    a number of pixels of the color image of the target face is greater than or equal to a first threshold; and
    light intensity greater than or equal to a second threshold.

5. The method in accordance with claim 1, wherein:
    the data about the first parameter for identifying the facial category of the target face is obtained from training the neural network with color images of face samples; and
    the color image of the face samples comprises information of a plurality of channels of the color images of the face samples.

6. The method in accordance with claim 5, wherein, before the neural network is trained with the color images of the face samples, the method further comprises performing an identical second processing on the information of a plurality of channels of the color images of the face samples, the second processing comprising at least one of:
    determining feature points of the information of the plurality of channels of the color images of the face samples, rotating the information of the plurality of channels of the color images of the face samples based on the feature points;
    performing mirroring, linear transformation, and affine transformation on the information of the plurality of channels of the color images of the face samples;
    aligning the feature points of the information of the plurality of channels of the color images of the face samples to a set position;

performing contrast stretching on the information of the plurality of channels of the color images of the face samples; and normalizing the information of each of the plurality of channels of the color images of the face samples with respect to pixel values of the color images.

7. The method in accordance with claim 6, wherein the normalizing the information of each of the plurality of channels of the color images of the face samples with respect to the pixel values of the color images comprises normalizing the information of each of the plurality of channels of the color images of the face samples with respect to a pixel value from [0,255] to [0,1].

8. The method in accordance with claim 6, wherein the feature points are eye points.

9. The method in accordance with claim 5, wherein:
each of the face samples satisfies at least one of the following facial categories: gender, race, age range and age value;
each of the face samples and the information of the plurality of channels of the color image of the face sample satisfy a same facial category.

10. The method in accordance with claim 9, wherein:
the neural network further comprises cost functions carried by the face samples and corresponding to the different facial categories;
the neural network further comprises a first cost function that comprises a weighted sum of the cost functions corresponding to the different facial categories.

11. The method in accordance with claim 5, wherein the information of the plurality of channels of the color images of the face samples is information of three channels of an RGB-formatted or a YUV-formatted color image of the face samples.

12. The method in accordance with claim 1, wherein the neural network comprises a convolution neural network.

13. The method in accordance with claim 12, wherein:
the convolution neural network comprises one input layer, three group layers, two fully connected layers and four output layers; and
each of the group layers comprises a convolution layer, an activation layer and a lower sampling layer.

14. A non-transitory computer readable storage medium that stores a computer program, wherein the computer program performs the method according to claim 1 when executed by a first processor.

15. An apparatus for face classification, comprising a memory, a second processor, and a computer program stored in the memory and executable on the second processor, wherein the computer program performs the method according to claim 1 when executed by the second processor.

16. An apparatus for face classification, comprising: a processor and a neural network, wherein the processor
acquires a color image of a target face, the color image comprising information of a plurality of channels,
determines that the color image of the target face qualifies for inputting into the neural network in accordance with at least one of the following parameters: a pitch angle, a drift angle, a roll angle, and a dimension and light conditions, and
inputs the information of the plurality of channels of the color image of the target face into the neural network,
wherein the neural network is configured to classify the target face in accordance with the information of the plurality of channels of the color image of the target face and a first parameter, the first parameter comprising at least one facial category and data about the first parameter for identifying a facial category of the target face,
wherein the processor comprises a first processing module that performs, before inputting the information of the plurality of channels of the color image of the target face into the neural network, an identical first processing on the information of the plurality of channels of the color image of the target face,
wherein the first processing module comprises a first normalizing sub-module that normalizes the information of each of the plurality of channels of the color image of the target face with respect to a pixel value from [0,255] to [0,1],
wherein, before inputting the information of the plurality of channels of the color image of the target face into the neural network, the processor further:
obtains a multidimensional output vector; and
inputs the multidimensional output vector to layers of the neural network to successively obtain output results pertaining to the target face,
wherein, when the color image of the target face is determined to be not qualified, the processor further stops inputting the color image into the neural network and stops classification of the color image of the target face, and
wherein the facial category of the target face included in the first parameter comprises gender, race, age range, and age value.

17. The apparatus in accordance with claim 16, wherein the processor places the color image of the target face into at least one corresponding folder in accordance with a result from a classification of the target face.

18. The apparatus in accordance with claim 17, wherein the information of the plurality of channels of the color image of the target face comprises information of three channels of an RGB-formatted or a YUV-formatted color image of the target face.

19. The apparatus in accordance with claim 16, wherein the image qualification determining module is specifically configured to determine that the color image of the target face is qualified in accordance with at least one of the following parameters:
the pitch angle is smaller than or equal to a first angle; the drift angle is smaller than or equal to a second angle;
the roll angle is smaller than or equal to a third angle;
a number of pixels of the color image of the target face is greater than or equal to a first threshold; and
light intensity is greater than or equal to a second threshold.

20. The apparatus in accordance with claim 16, wherein:
the data about the first parameter for identifying the facial category of the target face is obtained from training the neural network with color images of multiple face samples; and
the color images of the face samples comprise information of a plurality of channels of the color images of the face samples.

21. The apparatus in accordance with claim 20, wherein:
the processor further comprises a second processing module;
the second processing module is configured to perform, before the neural network is trained with the color images of the multiple face samples, an identical second processing on the information of a plurality of channels of the color images of the face samples;

the second processing module comprises at least one of the following sub-modules: a rotating sub-module, a transforming sub-module, an aligning sub-module, a contrast stretching sub-module and a second normalizing sub-module, wherein:

the rotating sub-module is configured to determine feature points of the information of the plurality of channels of the color images of the face samples, and rotate the information of the plurality of channels of the color images of the face samples based on the feature points;

the transforming sub-module is configured to perform mirroring, linear transformation, and affine transformation on the information of the plurality of channels of the color images of the face samples;

the aligning sub-module is configured to align the feature points of the information of the plurality of channels of the color images of the face samples to a set position;

the contrast stretching sub-module is configured to perform contrast stretching on the information of the plurality of channels of the color images of the face samples; and the second normalizing sub-module is configured to normalize the information of each of the plurality of channels of the color images of the face samples with respect to pixel values of the color images.

22. The apparatus in accordance with claim 21, wherein the second normalizing sub-module is specifically configured to normalize the information of each of the plurality of channels of the color images of the face samples with respect to a pixel value from [0,255] to [0,1].

23. The apparatus in accordance with claim 21, wherein the feature points are eye points.

24. The apparatus in accordance with claim 20, wherein:
each of the face samples satisfies at least one of the following facial categories: gender, race, age range and age value;
each of the face samples and the information of the plurality of channels of the color image of the face sample satisfy a same facial category.

25. The apparatus in accordance with claim 24, wherein:
the neural network further comprises cost functions carried by the face samples and corresponding to the different facial categories;
the neural network further comprises a first cost function that comprises a weighted sum of the cost functions corresponding to the different facial categories.

26. The apparatus in accordance with claim 20, wherein the information of the plurality of channels of the color images of the face samples is information of three channels of an RGB-formatted or a YUV-formatted color image of the face samples.

27. The apparatus in accordance with claim 16, wherein the neural network comprises a convolution neural network.

28. The apparatus in accordance with claim 27, wherein:
the convolution neural network comprises one input layer, three group layers, two fully connected layers and four output layers; and
each of the group layers comprises a convolution layer, an activation layer and a lower sampling layer.

* * * * *